INVENTOR.
D.E. LUPFER

Feb. 20, 1962  D. E. LUPFER  3,021,679
ANALYZER AND CONTROL SYSTEM WITH PNEUMATIC TRANSDUCER
Filed Oct. 11, 1957  6 Sheets-Sheet 5

INVENTOR.
D. E. LUPFER
BY Hudson & Young
ATTORNEYS

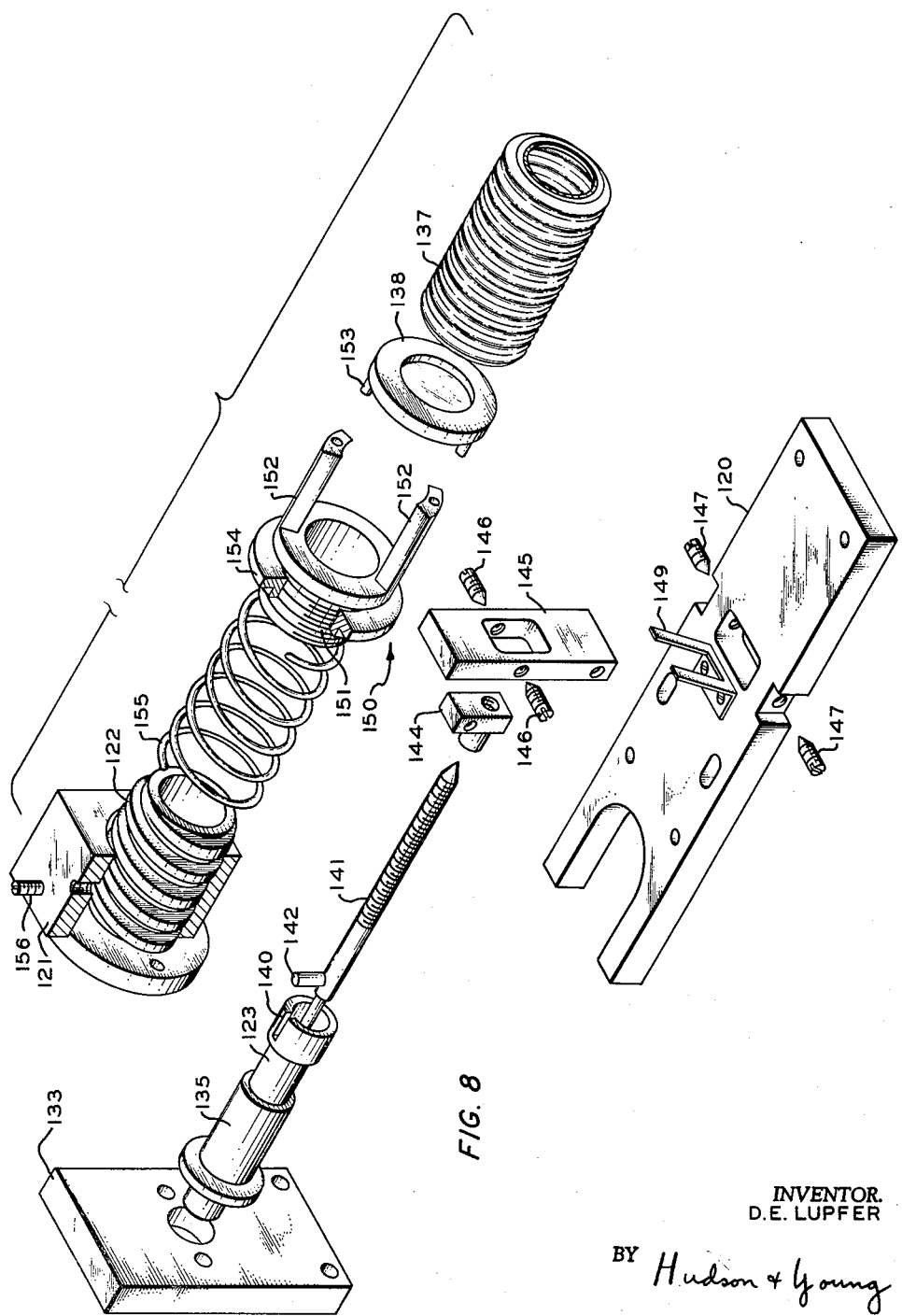

3,021,679
ANALYZER AND CONTROL SYSTEM WITH
PNEUMATIC TRANSDUCER
Dale E. Lupfer, Bartlesville, Okla., assignor to Phillips
Petroleum Company, a corporation of Delaware
Filed Oct. 11, 1957, Ser. No. 689,543
6 Claims. (Cl. 60—102)

This invention relates to optical analyzers, fluid blending control systems and pneumatic transducers.

In various measuring and control devices there is a need for instruments which are capable of converting mechanical displacements, electrical signals or pneumatic pressures into corresponding signals of other types. For example, in optical instruments the displacement or magnitude of a light beam to be measured often is converted into an electrical signal by suitable detecting elements. This electrical signal is amplified and converted into a corresponding pneumatic pressure which is applied to a control instrument of the type commonly employed in industrial plants. A differential refractometer is an instrument of this type. In various process control systems the instrument response must be a non-linear function of the measured variable. For example, a fluid blending control system often must make adjustments both for variations in relative flows and changes in composition of one or more of the streams being blended. These variables often change in a non-linear fashion.

In accordance with the present invention there is provided a novel pneumatic transducer which can advantageously be employed in various types of measuring instruments. A first embodiment of this instrument is adapted to amplify mechanical displacements. The instrument incorporates a differential gear having the respective inputs driven by individual air turbines. A mechanical displacement to be measured pivots a flapper to regulate the relative air flows to the individual turbines. A substantial mechanical amplification is provided in this manner. A second form of this transducer operates to convert a pneumatic pressure into a corresponding mechanical displacement.

In accordance with a second embodiment of this invention, an improved differential refractometer is provided which eliminates the need for electronic amplifiers. The output signal from a single radiation detector is converted into a mechanical displacement to balance the refractometer by means of the transducer of this invention.

In accordance with a third embodiment of this invention, a fluid blending control system is provided which is capable of maintaining a blended stream of desired composition despite fluctuations in flows and compositions of the two streams being blended. This control system also utilizes the transducer of this invention to provide a non-linear output signal from a primary measuring instrument.

Accordingly, it is an object of this invention to provide a pneumatic transducer for converting electrical signals or mechanical displacements into amplified mechanical displacements.

Another object of the invention is to provide a transducer for converting pneumatic pressures in to corresponding mechanical displacements.

Another object is to provide an improved differential refractometer.

A further object is to provide an improved fluid blending control system.

Other objects, advantages and features of this invention should become apparent from the following detailed description which is taken in conjunction with the accompanying drawing in which:

FIGURE 8 is an exploded view showing details of the computer of FIGURE 7.

Figure 1:
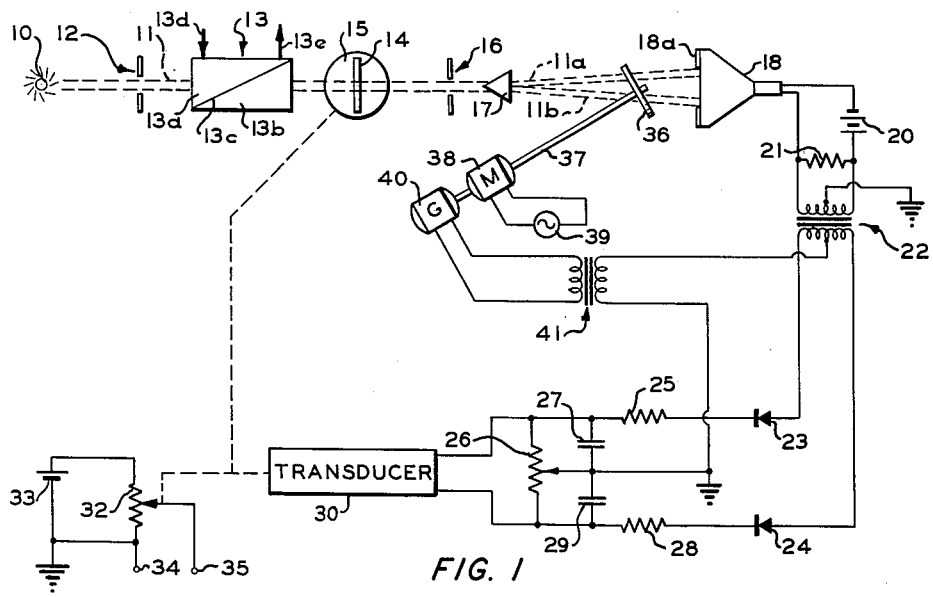
FIGURE 1 is a schematic representation of the differential refractometer of this invention.

Referring now to the drawing in detail, and to FIGURE 1 in particular, there is shown a light source 10 which preferably provides radiation in the visible spectrum, although radiation in the ultraviolet and infrared spectrums can also be employed. A beam of radiation 11 from source 10 is directed by an aperture 12 through a refractive cell assembly 13. This assembly comprises cells 13a and 13b which are separated by a diagonal plate 13c of radiation transparent material. Cell 13a preferably is provided with an inlet 13d and an outlet 13e so that a fluid sample to be measured can be circulated continuously through the cell. The radiation beam emerging from the cell assembly passes through a block 14 of radiation transparent material which is mounted on a rotatable base 15. The radiation beam then passes through an aperture 16 so as to impinge upon the apex of a prism 17. Prism 17 separates the beam into two beams 11a and 11b which normally impinge on a radiation detector 18. Detector 18 is provided with a mask 18a on the face thereof to limit the amount of radiation which is received by the detector.

Cell 13a is filled with a sample of the fluid to be measured, whereas cell 13b is filled with a reference fluid. If the refractive indices of the two fluids are the same, radiation beam 11 emerges from the sample in a direction parallel to the direction the beam entered the assembly. Deflector block 14 normally is positioned so that this beam impinges directly on the apex of prism 17. The two beams 11a and 11b then impinge on detector 18 in equal amounts. If the refractive index of the sample fluid should change, the radiation beam is deflected in one direction or the other so that one of the beams 11a and 11b no longer impinges entirely upon detector 18. However, the deflected beam can be shifted back toward the original position by rotation of block 14. The amount of rotation necessary to restore this balanced condition is representative of changes in the refractive index of the sample fluid.

Detector 18 preferably is a photo resistive cell. One terminal of the cell is connected to the first terminal of a voltage source 20, the second terminal of which is connected to the first terminal of resistor 21. The second terminal of resistor 21 is connected to the second terminal of cell 18. The primary winding of a transformer 22 is connected across resistor 21, and the center tap of primary winding of transformer 22 is connected to ground. The end terminals of the secondary winding of transformer 22 are connected to the first terminals of respective rectifiers 23 and 24. The second terminal of rectifier 23 is connected through a resistor 25 to the first end terminal of a potentiometer 26. A capacitor 27 is connected between the first end terminal of potentiometer 26 and ground. The second terminal of rectifier 24 is connected through a resistor 28 to the second end terminal of potentiometer 26. A capacitor 29 is connected between the second end terminal of potentiometer 26 and ground. The contactor of potentiometer 26 also is connected to ground. The end terminals of potentiometer 26 are connected to the respective input terminals of a transducer 30 which is described hereinafter in conjunction with FIGURE 3. The output of transducer 30 is also connected to the contactor of a potentiometer 32 which has a voltage source 33 is applied across the end terminals thereof. One end terminal and the contactor of potentiometer 32 are connected to respective terminals 34 and 35, which can be connected to a recorder or a control instrument. The voltage appearing between these terminals is thus representative of the rotation of block 14 which in turn is representative of the refractive index of the sample fluid in cell 13a.

Figure 2:
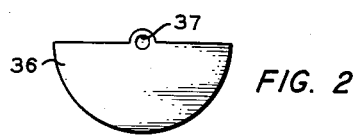
FIGURE 2 is a detailed view of the light beam chopper employed in the refractometer of FIGURE 1.

A disk 36, see FIGURE 2, is connected to the drive shaft 37 of a constant speed motor 38 so as to be rotated in radiation beams 11a and 11b. Motor 38 is energized by a current source 39. Disk 36 is rotated by motor 38 so that the two radiation beams are alternately blocked by the opaque sector. An alternating current generator 40 is also connected to the drive shaft of motor 38 so as to provide an output signal of the same frequency as the frequency at which disk 32 blocks the two radiation beams. The output signal of generator 40 is applied to the primary winding of a transformer 41. The end terminals of the primary winding of transformer 41 are connected to the center tap of the secondary winding of transformer 22 and to ground, respectively.

If radiation beams 11a and 11b are centered on detector 18, the output signal therefrom is a direct voltage. This should be evident because the detector is illuminated by the equivalent of one of the radiation beams at all times. The alternating signal applied to the detecting circuit from generator 40 results in a uniform voltage drop across potentiometer 26 so that both end terminals of potentiometer are maintained at the same potential. A zero signal is thus applied to transducer 30. If radiation beam 11 should be deflected so that beam 11a, for example, is moved upwardly, an alternating signal at first phase is provided by detector 18. This results from the fact that radiation beam 11b illuminates the detector to a greater degree than does beam 11a. Radiation of varying magnitude thus impinges upon the detector due to rotation of the disk 36. The resulting alternating output signal is applied to the input of the phase sensitive rectifier circuit in such a manner that one end terminal of potentiometer 26 acquires a greater potential than does the second end terminal. This results in a direct current signal being applied to the input of transducer 30. If the radiation beam 11 should be deflected so that beam 11b is moved downwardly, a direct voltage of opposite polarity is applied to the input of transducer 30. As explained hereinafter in detail, transducer 30 provides an output signal which rotates block 14 to center the beams on detector 18.

Figure 3:
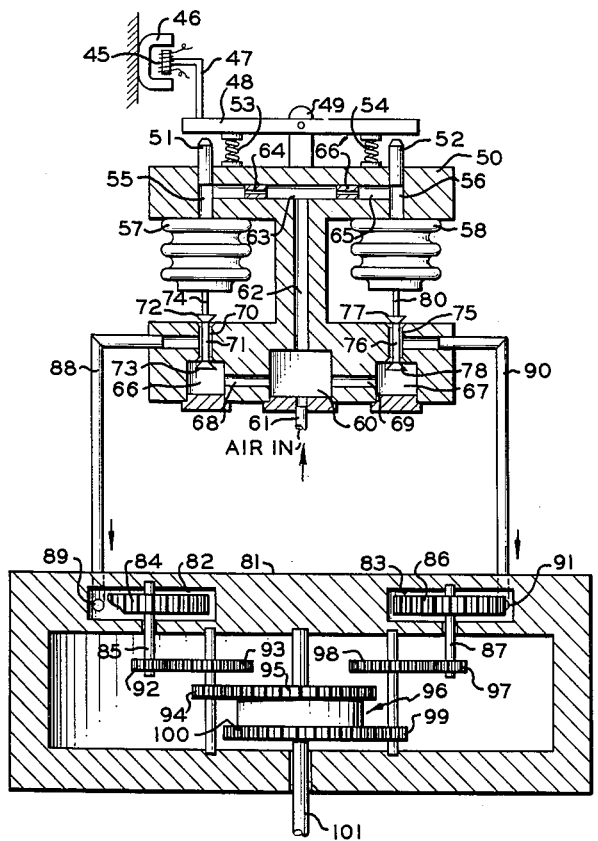
FIGURE 3 is a schematic view, shown partially in section, of the transducer employed in the servo system of the refractometer of FIGURE 1.

Transducer 30 is illustrated in detail in FIGURE 3. The electrical signal to be measured is applied to a coil 45 which is positioned in the field of a stationary permanent magnet 46. Coil 46 is mounted, by means of a support 47, on a flapper plate 48 which is pivotally attached to a support 49. Support 49 is attached to a stationary housing 50. First and second nozzles 51 and 52 extend upwardly from housing 50 to regions adjacent the respective ends of plate 48. Springs 53 and 54 extend between housing 50 and plate 48 to tend to center the plate equally distant from nozzles 51 and 52. Nozzles 51 and 52 are connected by respective passages 55 and 56 in housing 50 to the interiors of respective bellows 57 and 58 which depend from the upper section of housing 50.

Housing 50 is provided with a chamber 60 which is supplied with air under pressure by means of an inlet conduit 61. Chamber 60 communicates with passage 55 by means of passages 62 and 63, the latter having a restriction 64 therein. Chamber 60 also communicates with passage 56 through passages 62 and 65, the latter having a restriction 66' therein. Chamber 60 communicates with chambers 66 and 67 in housing 50 through respective passages 68 and 69. Chamber 66 communicates with the atmosphere through a passage 70. A rod 71, having valve heads 72 and 73 at the respective ends thereof, is connected by rod 74 to the bottom of bellows 57. Chamber 67 communicates with the atmosphere through a passage 75. A rod 76, having valve heads 77 and 78 at the respective ends thereof, extends through passage 75 and is connected to bellows 58 by means of a rod 80.

A second housing 81 is provided with respective chambers 82 and 83. A spur gear 84 is mounted on a shaft 85 for rotation within chamber 82, and a spur gear 86 is mounted on a shaft 87 for rotation within chamber 83. A conduit 88 communicates between passage 70 and an inlet port 89 in chamber 82 so that air enters chamber 82 in a direction to rotate gear 85. The air is subsequently vented from chamber 82 through an outlet port, not shown. A conduit 90 communicates in like manner passage 75 and an inlet port 91 in chamber 83. The introduction of pneumatic pressure into these chambers thus results in rotation of the two gears, thereby forming two air turbines. Shaft 85 is connected by speed reduction gears 92, 93 and 94 to the first input gear 95 of a differential gear assembly 96. Shaft 87 is connected by speed reduction gears 97, 98 and 99 to a second input gear 100 of assembly 96. A shaft 101 constitutes the output of the differential gear assembly, and is connected to base 15 of FIGURE 1.

If flapper plate 48 is positioned the same distances above nozzles 51 and 52, the air in chamber 60 bleeds out of these two nozzles at the same rate. This results in the same pressures being applied to the interiors of bellows 57 and 58 so that rods 71 and 76 occupy the same positions relative to housing 50. Air from chamber 60 thus enters conduits 88 and 90 at the same rate so that turbines 84 and 86 are rotated at the same speed. The differential gear output shaft 101 thus remains stationary. If direct current of a first polarity is applied to coil 45, this coil tends to move downwardly, for example, so that nozzle 51 is restricted more than is nozzle 52. Pressure then builds up in bellows 57 so that valve head 73 moves further off its seat. Valve head 78 on the other hand, moves closer to its valve seat. This results in more air being applied to conduit 88 than to conduit 90 so that turbine 84 rotates at a greater speed than does turbine 86. Output shaft 101 thus rotates in a first direction. If the current applied to coil 45 is of opposite polarity, the reverse action takes place so that shaft 101 rotates in the opposite direction. The transducer of FIGURE 1 thus provides a servo unit for rotating block 14 in a direction representative of the polarity of the output signal from the phase sensitive rectifier of FIGURE 1.

It should be evident that the transducer of FIGURE 3 is capable of converting an extremely small current into a mechanical displacement of relatively large magnitude. The pneumatic relays formed between the bellows and the associated turbines provide both pressure and volume amplification. This transducer thus provides an important component of the differential refractometer of FIGURE 1 wherein a balancing circuit is provided which does not require any kind of electronic amplifier. It should be evident that the transducer of FIGURE 3 can also be used in other types of instruments wherein it is desired to convert an electrical signal or a mechanical displacement into an amplified mechanical displacement.

Figure 4:
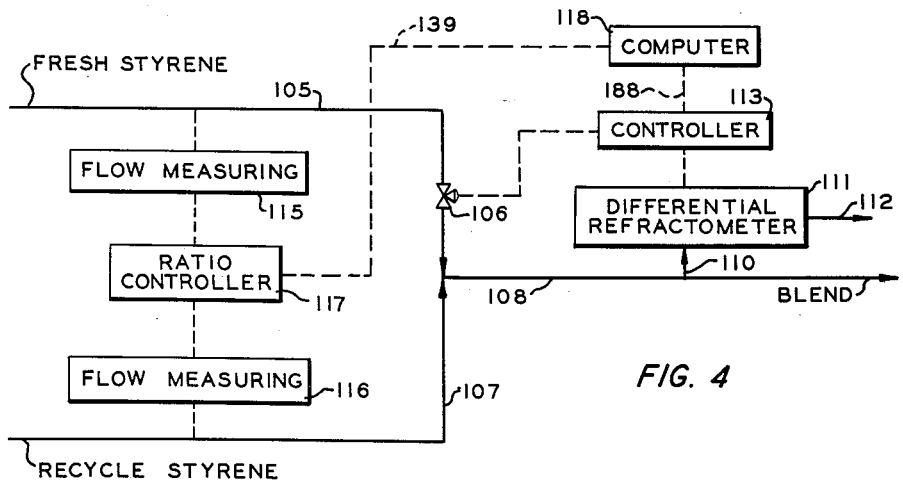
FIGURE 4 is a schematic representation of the fluid blending control system of this invention.

In FIGURE 4 there is shown a fluid blending control system incorporating the transducer of this invention. This particular system is employed in the manufacture of synthetic rubber by the copolymerization of butadiene and styrene. One of the problems is to blend fresh styrene with recycle styrene from the reactors to obtain a feed stream having a desired styrene concentration, 96 percent, for example. The fresh styrene enters the system through a conduit 105 which has a control valve 106 therein. The recycle styrene enters the system through a conduit 107. Conduits 105 and 107 communicate with a common outlet conduit 108.

Figure 5:
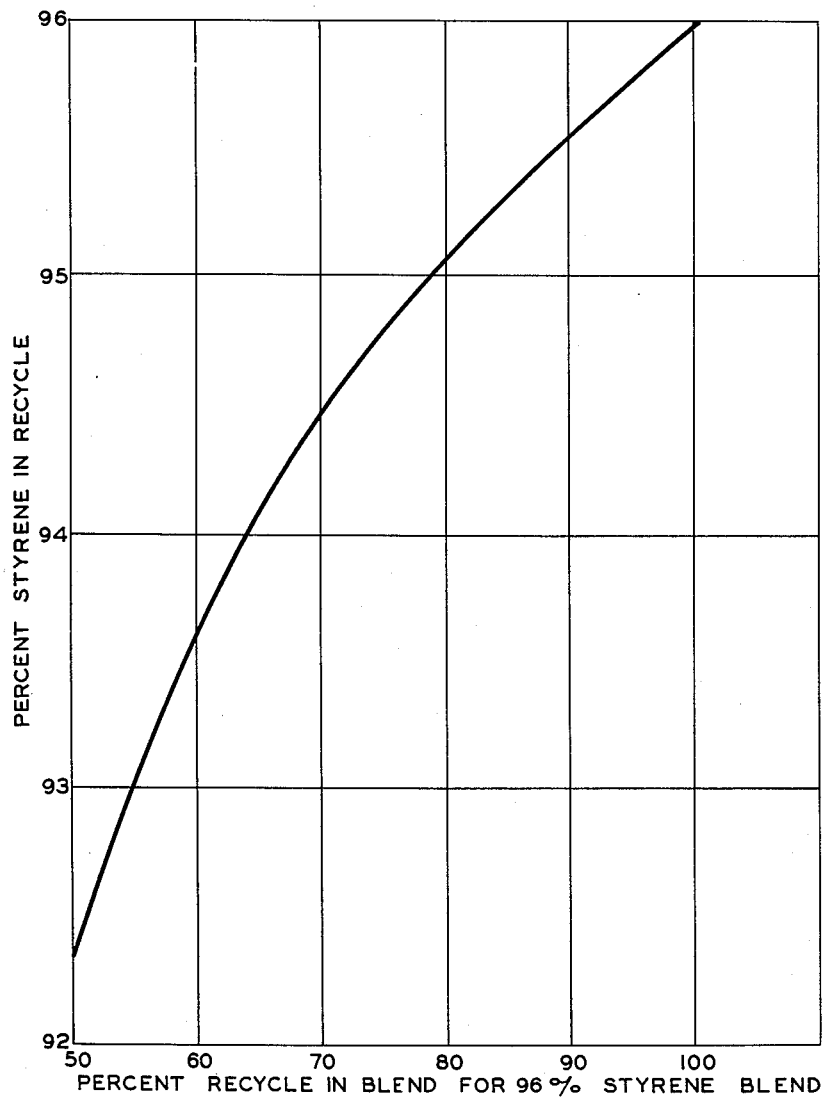
FIGURES 5 and 6 are graphical representations of variations in compositions of specific fluids to be blended in the system of FIGURE 4.

The fresh styrene in this particular example has an average concentration of approximately 99.56 styrene. The concentration of the recycle stream varies from about 92.6 percent styrene to 96 percent styrene. It is thus evident that the ratio of the flows of the two streams must be varied as the composition of the recycle stream changes in order to obtain a blend having the desired concentration of 96 percent styrene. When the recycle stream contains 96 percent styrene, the blend comprises 100 percent recycle styrene. When the recycle stream contains 92.6 percent styrene, the blend comprises approximately 50 percent recycle styrene and 50 percent fresh styrene. FIGURE 5 illustrates graphically the percent of recycle styrene employed as a function of the percent of styrene in the recycle stream.

The desired ratio is maintained in the control system of FIGURE 4 by adjustment of valve 106 which controls the amount of fresh styrene which enters conduit 108. A sample of the blend stream is withdrawn through a conduit 110 which communicates with the inlet of differential refractometer 111. This sample is vented from refractometer 111 through a conduit 112. Refractometer 111, which can advantageously be of the form illustrated in FIGURE 1, provides an output signal representative of the refractive index of the styrene blend. This signal is applied to a controller 113, which can be a conventional commercially available instrument, which in turn provides an output signal, such as a pneumatic pressure, to adjust valve 106 in response to the measured refractive index of the sample stream. If the refractive index of the blended styrene stream were the same for a 96 percent composition regardless of the ratio of the flows of fresh to recycle streams, the control system thus far described would be adequate. However, the refractive index of the blend varies for a 96 percent composition when the blend is formed from different ratios of the fresh to recycle streams. This is due to the fact that the recycle stream is a mixture of approximately six constituents which are present in varying amounts depending upon the concentration of styrene. Typical compositions (percent) of the recycle stream are set forth in the following table:

| Styrene | 1,3-Butadiene | Ethyl Benzene | Butadiene Dimer | C-9 Aromatics | Methyl Styrene |
|---|---|---|---|---|---|
| 92.6 | 3.7 | 0.4 | 2.7 | 0.6 | 0.100 |
| 93.6 | 2.7 | 0.4 | 2.7 | 0.6 | 0.142 |
| 94.2 | 2.5 | 0.4 | 2.3 | 0.6 | 0.161 |
| 94.6 | 2.2 | 0.4 | 2.2 | 0.6 | 0.127 |
| 95.3 | 2.0 | 0.2 | 2.0 | 0.5 | 0.131 |
| 95.6 | 1.4 | 0.4 | 2.0 | 0.6 | 0.151 |
| 96.0 | 1.4 | 0.2 | 1.9 | 0.5 | 0.112 |

Figure 6:
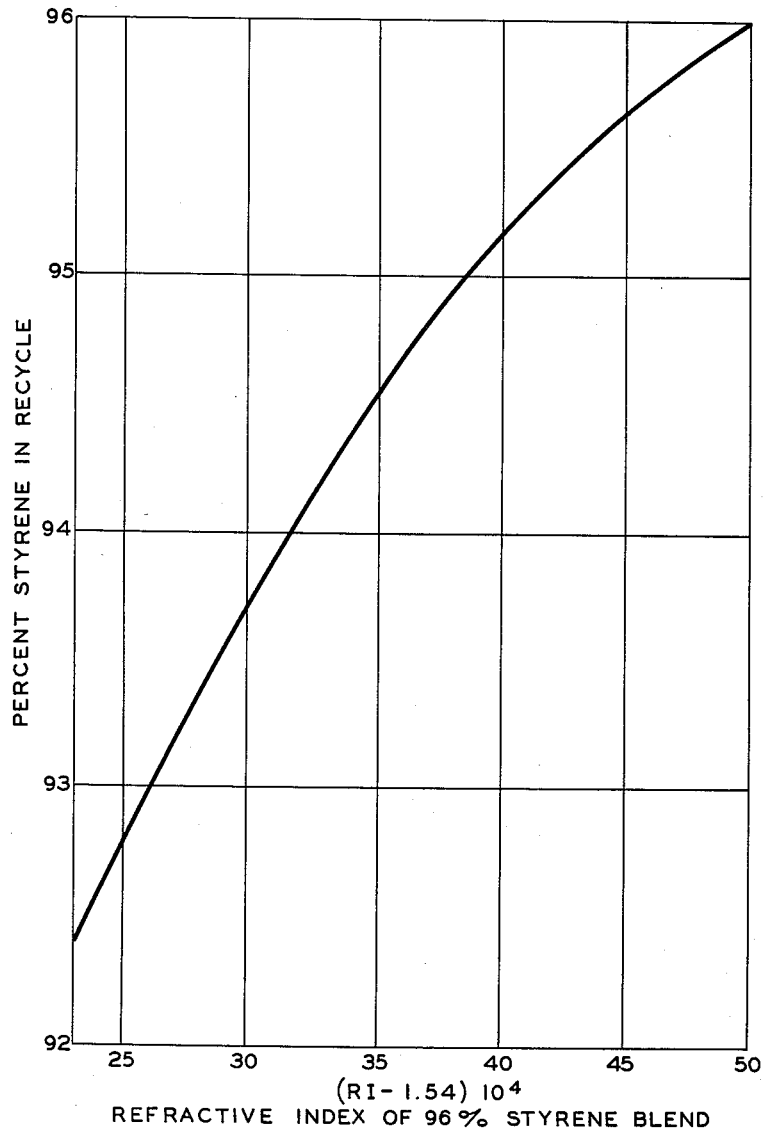

The refractive index of the blended stream is thus a function of the percent of styrene in the recycle stream. This relationship is expressed graphically in FIGURE 6 wherein it can be seen that the refractive index varies from about 1.5423 for a 92.4 percent styrene stream to about 1.5450 for a 96 percent styrene stream. This requires that the output signal from controller 114 of FIGURE 4 be varied in a non-linear fashion (as shown by the curve of FIGURE 6) in response to the output signal from refractometer 111.

In order to adjust the output of controller 113, conventional flow measuring instruments 115 and 116 are provided to establish signals representative of the flows through respective conduits 105 and 107. The output signals of these flow measuring instruments are applied to the respective inputs of a conventional ratio controller 117 which provides an output signal representative of the ratio of the two flows. This signal is applied through a computer 118 to reset controller 113 in accordance with the curve of FIGURE 6 so that the ratio of the two styrene streams is maintained at a value such as to produce a blended stream having the desired styrene concentration.

Figure 7:
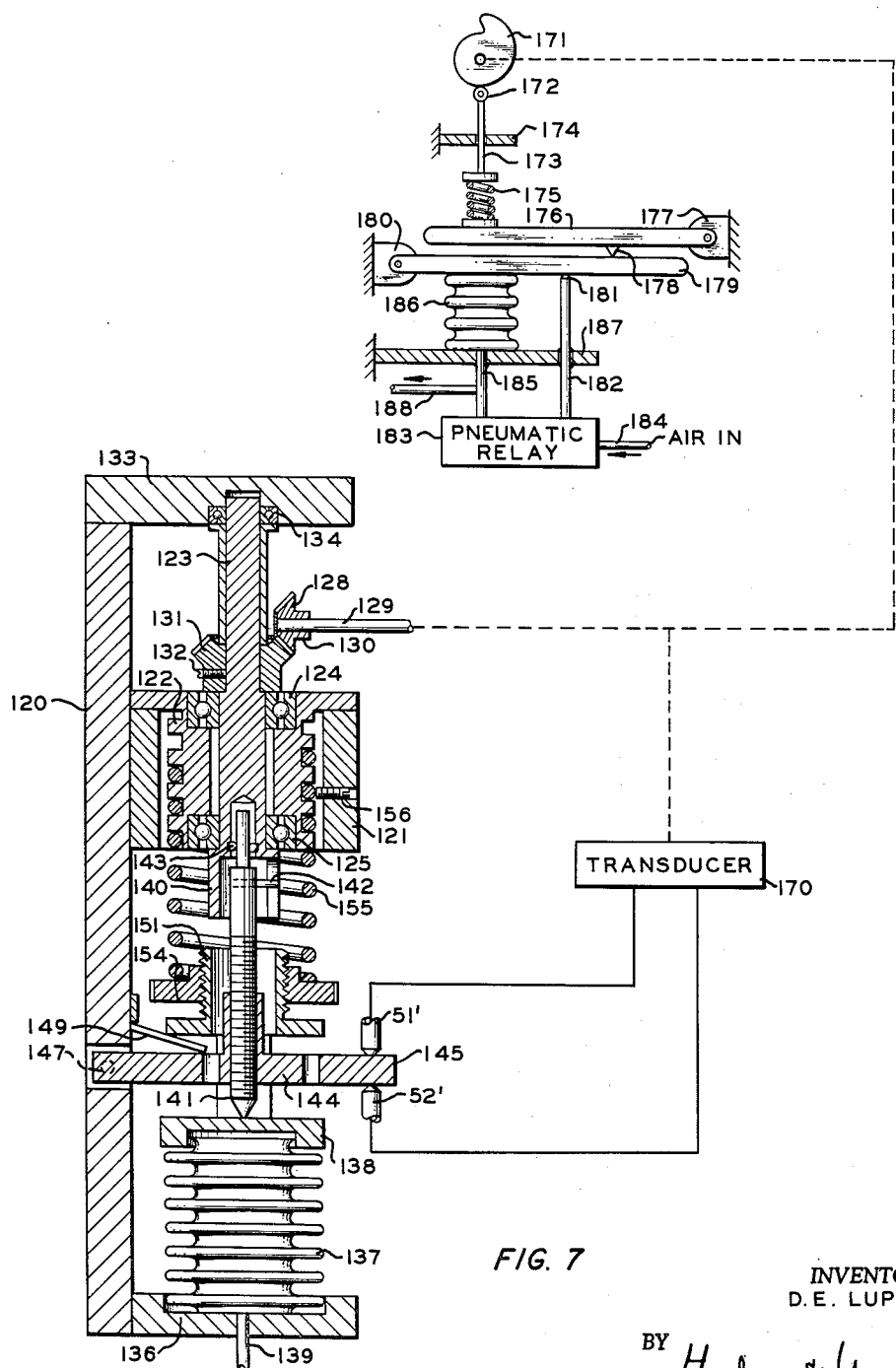
FIGURE 7 is a schematic representation of the computer employed in the control system of FIGURE 4.

Computer 118 is illustrated in FIGURES 7 and 8. The computer comprises a support plate 120 to which is attached a spring retainer mounting block 121. Block 121 supports a spring retainer sleeve 122. A shaft 123 extends through sleeve 122 and is supported therein by bearing assemblies 124 and 125. A first bevel gear 128 is attached to a shaft 129 by a set screw 130. A second bevel gear 131 is attached to drive shaft 123 by a set screw 132 so as to engage gear 128. The first end of shaft 123 extends into an end plate 133 and rotates on a bearing assembly 134.

A base plate 136 is attached to the opposite end of support plate 120. A positioning bellows 137 is secured to base plate 136 and extends therefrom toward mounting block 121. A bellows plate 138 is attached to the second end of bellows 137. The second end of shaft 123 is provided with a slotted sleeve 140, see FIGURE 8, which receives a flapper positioning screw 141 that has a pin 142 protruding therefrom into the slot of sleeve 140. Pin 142 is free to move longitudinally of shaft 123 and is aligned therein by bearings 143. Screw 141 is threaded at the opposite end through a flapper positioning nut 144 and engages bellows plate 138. Nut 144 is pivotally attached to a flapper 145 by screws 146. Flapper 145 is in turn pivotally attached to support plate 120 by screws 147. Flapper 145 is urged toward bellows plate 138 by a spring 149 which is attached to support plate 120.

A zeroing assembly 150 engages bellows plate 138. This assembly comprises a threaded sleeve 151 having a pair of legs 152 depending therefrom into engagement with bellows plate 138. Plate 138 is provided with pins 153 which enter corresponding openings in legs 152. A spring retaining nut 154 is threaded to sleeve 151 of the assembly. A compression spring 155 engages retaining nut 154 and extends therefrom into engagement with the external threads on spring retainer sleeve 122. Spring 155 is attached to sleeve 122 by a set screw 156.

Nozzles 51' and 52' are positioned on opposite sides of flapper plate 145. These nozzles correspond to respective nozzles 51 and 52 of FIGURE 3. The computer of FIGURE 7 is provided with a transducer 170 which is identical to the transducer of FIGURE 3 except for the positions of the two nozzles 50 and 51. The output drive shaft of the transducer is connected to shaft 129 which rotates gear 128.

The output signal from controller 117, which is a pneumatic pressure, is applied to the interior of bellows 137 by a conduit 139. If this pressure should increase, for example, plate 145 is moved toward nozzle 51' and away from nozzle 52'. The output shaft of transducer 170 moves in a first direction to rotate shaft 129 in a direction to tend to move plate 145 to a new equilibrium position between nozzles 51' to 52', thus providing negative feedback. If the pressure applied to bellows 137 should decrease, the reverse movement takes place. For a more detailed description of the balancing operation of the apparatus of FIGURE 8, reference is made to my copending application, Serial No. 536,720, filed September 26, 1955, now Patent No. 2,890,707.

The output shaft of transducer 170 is connected to a cam 171 which has a configuration that corresponds to the curve of FIGURE 6. Cam 171 engages a roller 172 which is attached to a rod 173 that is contained for movement through a support 174. The second end of rod 173 is connected through a light spring 175 to the free end of a rod 176 which is pivotally attached to a support 177. An adjustable pivot point 178 extends between rod 176 and a second rod 179 which is pivotally attached to a support 180. A nozzle 181 is positioned by a support 187 adjacent rod 179 so that rotation of rod 179 about support 180 results in the nozzle being blocked and unblocked. Nozzle 181 is connected by a conduit 182 to a pneumatic relay 183 which is supplied with air under pressure by means of a conduit 184. The outlet of pneumatic relay 183 is connected by a conduit 185 to the interior of a bellows 186 which extends between support 182 and rod 179. An outlet conduit 188 communicates with conduit 185.

Cam 171 is rotated in response to changes in the ratio of flows through conduits 105 and 107 of FIGURE 4. This rotation is in turn transferred through the rod linkage to control the rate at which air bleeds out through nozzle 181. This in turn adjusts the pressure in outlet conduit 188 as a function of the relative flows through conduits 105 and 107. This output air pressure adjusts the set point of controller 113 in the manner previously described so that refractometer 111 controls valve 10t to maintain the blended stream of desired composition.

In view of the foregoing description it should be evident that there is provided in accordance with this invention a novel pneumatic transducer which can be employed in a number of control instruments. There is also provided in accordance with this invention a simplified differential refractometer which has high sensitivity and which operates without an electronic amplifier. There is also provided an improved control system for fluid blending operations which compensates both for changes in the ratio of the flows of the streams blended and changes in composition of the streams.

While the invention has been described in conjunction with present preferred embodiments, it should be evident that it is not limited thereto.

What is claimed is:

1. A transducer comprising a differential gear having first and second inputs and an output which rotates in a direction and at a speed representative of the relative rotations of said first and second inputs, a first turbine connected to said first input, a second turbine connected to said second input, said turbines being so adapted as to rotate in opposite directions, a source of fluid under pressure, and valve means responsive to a variable to be measured to control the relative rate of fluid transmission from said source to said first and second turbines to rotate same, the relative rates at which the fluid is transmitted to said turbines being representative of the variable to be measured.

2. Apparatus for converting a mechanical displacement into a representative shaft rotation comprising differential gears having an output shaft and gear, first and second turbines and first and second input gears, a source of fluid under pressure, first conduit means having a valve means therein communicating between said source of fluid and said first turbine, second conduit means having a second valve therein communicating between said source of fluid and said second turbine, means connecting said first turbine to the input of said first input gear, means connecting said second turbine to the input of said second input gear, and displacement means responsive to a variable to be measured and to said fluid under pressure connected to said first and second valves to control same so that one of said valves moves toward an open position when the other moves toward a closed position and vice versa, thereby regulating the relative flows of fluid to said turbines and both the speed and direction of rotation of said output shaft.

3. The apparatus of claim 2 wherein said displacement means comprises first and second expansible members, means connecting said first and second members to said first and second valves, respectively, third conduit means having a restriction therein communicating between said source of fluid and the interior of said first expansible member, fourth conduit means having a restriction therein communicating between said source of fluid and the interior of said second expansible member, a first nozzle communicating with the interior of said first expansible member, a second nozzle communicating with the interior of said second expansible member, and a flapper pivotally mounted to move toward said first nozzle and away from said second nozzle and vice versa.

4. The apparatus of claim 3 further comprising a coil secured to said flapper, means to establish a magnetic field in the region of said coil, and means to supply a current to be measured to said coil, thereby to move said coil in said magnetic field to establish a mechanical displacement.

5. The apparatus of claim 2 further comprising a third valve communicating between a region of reference fluid pressure and said first conduit means between said first valve and said first turbine, a fourth valve communicating between said region of reference fluid pressure and said second conduit means between said second valve and said second turbine, means connecting said third valve to said first valve so that third valve moves toward a closed position when said first valve moves toward an open position and vice versa, and means connecting said fourth valve to said second valve so that said fourth valve moves toward a closed position when said second valve moves toward an open position and vice versa.

6. A transducer comprising a differential gear having first and second inputs and an output which rotates in a direction and at a speed representative of the relative rotations of said first and second inputs, a first turbine connected to said first input, a second turbine connected to said second input, a housing having a first chamber therein, first conduit means communicating with said first chamber to supply a pneumatic pressure, second conduit means communicating between said first chamber and the inlet of said first turbine, a first valve in said second conduit means, a second valve communicating between a region exterior of said housing and said first turbine, third conduit means communicating between said first chamber and the inlet of said second turbine, a third valve in said third conduit means, a fourth valve communicating between said region exterior of said housing and said third conduit means between said third valve and said second turbine, first and second nozzles extending from said housing, first and second expansible members supported by said housing, means connecting said first expansible member to said first and second valves so that expansion thereof tends to open said first valve and close said second valve and contraction thereof tends to close said first valve and open said second valve, means connecting said second expansible member to said third and fourth valves so that expansion thereof tends to open said third valve and close said fourth valve and contraction thereof tends to close said third valve and open said fourth valve, fourth conduit means communicating between said first chamber and the interior of said first nozzle, fifth conduit means communicating between the interior of said first nozzle and the interior of said first expansible member, sixth conduit means communicating between said first chamber and the interior of said second nozzle, seventh conduit means communicating between the interior of said second nozzle and the interior of said second expansible member, and a flapper plate pivotally attached to said housing so that rotation thereof in a first direction tends to block said first nozzle and unblock said second nozzle and rotation in a second direction tends to block said second nozzle and unblock said first nozzle.

References Cited in the file of this patent

UNITED STATES PATENTS

| | | |
|---|---|---|
| 1,960,615 | Boher | May 29, 1934 |
| 2,119,247 | Scott | May 31, 1938 |
| 2,599,885 | Benua | June 10, 1952 |
| 2,656,845 | Lindsay | Oct. 27, 1953 |
| 2,658,335 | Peterson | Nov. 10, 1953 |
| 2,680,446 | Blender | June 8, 1954 |
| 2,747,455 | Spracklen et al. | May 29, 1956 |
| 2,783,676 | Lanneau et al. | Mar. 5, 1957 |
| 2,826,956 | Simmons | Mar. 18, 1958 |
| 2,832,318 | Paine | Apr. 29, 1958 |
| 2,857,803 | Reinecke | Oct. 28, 1958 |
| 2,861,550 | Hanna | Nov. 25, 1958 |
| 2,868,216 | Robertson | Jan. 13, 1959 |
| 2,881,235 | Van Pool | Apr. 7, 1959 |